United States Patent [19]

Howard, Jr.

[11] 4,411,821
[45] Oct. 25, 1983

[54] 1-OLEFIN POLYMERIZATION CATALYST

[75] Inventor: Edward G. Howard, Jr., Hockessin, Del.

[73] Assignee: E. I. Du Pont de Nemours and Company, Wilmington, Del.

[21] Appl. No.: 348,167

[22] Filed: Feb. 17, 1982

Related U.S. Application Data

[63] Continuation-in-part of Ser. No. 237,459, Feb. 23, 1981, abandoned.

[51] Int. Cl.$^3$ .............................................. C08F 4/64
[52] U.S. Cl. ................................... 502/117; 502/129; 502/133; 526/123; 526/124
[58] Field of Search ............... 252/430, 431 R, 429 C

[56] References Cited

U.S. PATENT DOCUMENTS

| | | | |
|---|---|---|---|
| 3,635,935 | 1/1972 | Long | 260/94.9 |
| 3,816,340 | 6/1974 | Morris et al. | 252/430 |
| 3,840,508 | 10/1974 | Ballard et al. | 260/88.2 R |
| 3,875,132 | 4/1975 | Kruse | 260/93.7 |
| 3,932,307 | 1/1976 | Setterquist | 252/430 |
| 3,950,269 | 4/1976 | Setterquist | 252/430 |
| 4,018,707 | 4/1977 | Wyatt | 252/430 |
| 4,228,263 | 10/1980 | Howard, Jr. et al. | 526/154 |
| 4,298,722 | 11/1981 | Collette et al. | 526/348.6 |
| 4,304,685 | 12/1981 | Howard, Jr. et al. | 252/430 |

FOREIGN PATENT DOCUMENTS 2001080  1/1979  United Kingdom .

*Primary Examiner*—Patrick Garvin

[57] ABSTRACT

Improved 1-olefin polymerization catalyst system, and process employing same, comprising a reaction product of alumina and an organometallic compound of the formula $(RCH_2)_4M$ wherein M is Ti, Zr or Hf and R is a group which is such that there is no hydrogen atom attached to an atom which is in the $\beta$-position to M, the improvement characterized in that the preformed catalyst system is controlled in its mode of action and is protected from impurities by mixing with it an oxide, hydroxide, or carbonate of magnesium, calcium, strontium, or barium.

10 Claims, No Drawings

1-OLEFIN POLYMERIZATION CATALYST

CROSS-REFERENCE TO RELATED APPLICATION

This is a continuation-in-part of patent application Ser. No. 237,459 filed Feb. 23, 1981 and now abandoned.

DESCRIPTION

1. Technical Field

This invention relates to an improved organometallic compound/alumina catalyst system for polymerizing 1-olefins.

2. Background

U.S. Pat. No. 3,840,508 discloses a process for polymerizing olefinically unsaturated monomers using as an initiator a reaction product of a transition metal complex and a matrix material which has a hydroxylated surface but which is otherwise substantially inert.

U.S. Pat. No. 4,228,263 discloses a catalytic process for preparing elastomeric polymers of propylene. The catalyst, which is a reaction product of a metal oxide and an organometallic compound of the formula $(RCH_2)_4M$ wherein M is Zr, Ti or Hf and R is aryl, aralkyl, tertiary alkyl or trialkylsilyl, is prepared in situ in a solvent consisting principally of liquid propylene. A similar process for preparing elastomeric polypropylene, using the catalyst system of U.S. Pat. No. 3,932,307, infra, is disclosed in British Specification 2,001,080A.

U.S. Pat. No. 3,932,307 discloses a process for polymerizing 1-olefins with the catalyst which consists essentially of the reaction product of tetraneophylzirconium and a hydroxylated oxide of a metal of Group IIa, IIIa, IVa or IVb of the Periodic Table of the Elements. Fumed alumina, i.e., alumina prepared by burning aluminum chloride in the presence of water vapor, is an exemplified preferred metal oxide and provides an especially active catalyst system. Related catalyst systems and polymerization processes are disclosed in U.S. Pat. No. 3,950,269.

U.S. Pat. No. 3,635,935 discloses an improved process for polymerizing ethylene, using as the catalyst a tetra(aralkyl)titanium on a silica support, activated by an organoaluminum compound.

As is well known, and as is pointed out in the foregoing patents, it is essential to use clean apparatus and materials having high degrees of purity in such polymerization processes. Even when scrupulous care is exercised, however, impurities can be introduced into the polymerization system. Their presence can stop or slow down the polymerization reaction, resulting in lower yields of polymer, and in some instances can change the character of the polymeric product.

A continuing desirable objective, therefore, is to find ways of nullifying or minimizing the effects of such adventitious impurities.

DISCLOSURE OF INVENTION

For further comprehension of the invention and of the objects and advantages thereof reference may be made to the following description and to the appended claims in which the various novel features of the invention are more particularly set forth.

It has now been found that the reliability of the aforesaid 1-olefin-polymerization systems can be increased, and particularly that the yields of polyolefins produced can be improved, by incorporating into the polymerization system a scavenger oxide, hydroxide, or carbonate of a Group IIa metal, i.e., an alkaline-earth metal, having an atomic number of 12–56, inclusive, optionally in combination with a selected alkylaluminum compound. Surprisingly, therefore, the scavenger which is used in the improved catalyst system of this invention provides the aforesaid desirable features without adversely affecting the activity of the polymerization catalyst.

More particularly, the invention resides in an improved 1-olefin polymerization catalyst system comprising a reaction product of alumina and an organometallic compound of the formula $(RCH_2)_4M$ wherein M is Ti, Zr, or Hf and R is a group which is such that there is no hydrogen atom attached to an atom which is in the $\beta$-position to M, the improvement characterized in that the preformed catalyst system is controlled in its mode of action and is protected from impurities by mixing with it an oxide, hydroxide, or carbonate of magnesium, calcium, strontium, or barium. Magnesium and calcium compounds are preferred because of their ready availability. In addition to protecting the catalyst system from adventitious impurities, the scavenger helps to control the mode of action of the catalyst by removing any of the organometallic compound $(RCH_2)_4M$ that may be present free in solution in the liquid medium used for the polymerization.

The organometallic compound used in the invention is an organo(transition metal) compound of the formula $(RCH_2)_4M$ wherein M is the transition metal Ti, Zr, or Hf and R is a group which is such that there is no hydrogen atom attached to an atom, usually a carbon atom, which is in the $\beta$-position to M. More specifically, R is aryl, aralkyl, tertiary alkyl, for example, trialkylmethyl, or trialkylsilyl. Examples of $RCH_2$- include neophyl, benzyl and trimethylsilylmethyl. Representative organometallic compounds include tetraneophyl zirconium, -titanium or -hafnium, tetraneopentyl zirconium, -titanium or -hafnium, and tetrabenzyl zirconium, -titanium or -hafnium.

The 1-olefins that can be homopolymerized and/or copolymerized by means of the catalysts and polymerization processes of this invention include, in particular, ethylene, propylene, butene-1, pentene-1, hexene-1, heptene-1, octene-1, nonene-1, decene-1, 1,3-butadiene, 1,4-hexadiene, and other dienes having at least one terminal olefinic group. Homopolymers and copolymers which can be and/or have been prepared by the process of this invention, some of which preparations are described in the examples hereinafter, include ethylene and propylene homopolymers, ethylene-propylene copolymers and ethylene-propylene-1,4-hexadiene terpolymers.

The process conditions for carrying out homopolymerizations or copolymerizations with the catalysts of the invention are, except as noted hereinafter, those commonly used in the art for polymerizing 1-olefins with catalysts of the general type employed here. In connection therewith, reference may be made to the background discussion provided hereinabove. For example, the polymerizations can be conducted at 10°–300° C. at pressures of 1–1000 atmospheres $(1-1000 \times 10^5$ Pa) or more, using slurry or solution polymerization techniques. When magnesium carbonate is employed as the scavenger, the polymerization temperature should not grossly exceed 200° C. since the carbon dioxide which is formed (by decomposition of the carbonate at about 268°) is an inhibitor for the 1-olefin polymerization. Inert hydrocarbon media, including alkanes and cycloalkanes, such as n-hexane, n-heptane or cyclohexane, and aromatic compounds, such as toluene, can be employed in the polymerization. Known means can be used to control molecular weight and/or molecular weight distribution.

As indicated hereinabove, an alkylaluminum compound optionally can be included in the improved catalyst system of this invention. The alkylaluminum compound is selected from the group consisting of trialkylaluminums ($R^1R^2R^3Al$), dialkylaluminum hydrides ($R^1R^2AlH$), dialkylaluminum alkoxides ($R^1R^2AlOR^3$), alkylaluminum halides ($R^1R^2AlX$ and $R^1AlX_2$) and polymeric hydrocarbylaluminums in which the alkyl groups, alike or different, have 1 to about 10 carbon atoms each. Suitable compounds include the commercially available trimethylaluminum, triethylaluminum, tri-n-propylaluminum, triisobutylaluminum, tri-n-hexylaluminum, tri-n-octylaluminum, tri-n-decylaluminum, diethylaluminum hydride, diisobutylaluminum hydride, diethylaluminum ethoxide, diisobutylaluminum ethoxide, and the like. Polymeric hydrocarbylaluminums such as aluminum-isoprene polymers are described in U.S. Pat. No. 3,149,136. Preferred are the trialkylaluminums because of their ready availability and because of their noncorrosivity.

The amount of Group IIa metal compound in the polymerization system is such that the ($RCH_2$)$_4$M:Group IIa metal compound mole ratio is about 0.01:1 to 3:1, preferably about 0.4:1 to 1.1:1.

When the optional alkylaluminum compound is present, the alkylaluminum compound:Group IIa metal compound mole ratio is about 0.05:1 to 1.2:1, preferably, about 0.1:1 to 1:1. In no event should the ratio be so high as to result in there being free alkylaluminum compound in solution in the scavenger suspension. The presence of free alkylaluminum compound can be readily demonstrated by adding an indicator, such as o-phenanthroline, which gives a color with free alkylaluminum compounds but no color in the liquid when the alkylaluminum compound has reacted with and/or is adsorbed on the Group IIa metal compound. For example, free triisobutylaluminum gives an intense purple color. The mole ratio depends in part on the surface area of the Group IIa metal compound. The higher the surface area, the higher will be the amount of alkylaluminum compound that is readily adsorbed and/or reacted. With Group IIa metal compounds of relatively high surface areas, therefore, the ($RCH_2$)$_4$M:Group IIa metal compound mole ratio is at the high end of the aforesaid ranges.

As may be seen from the examples that follow, the order of addition of the components of the polymerization system can be varied. The scavenger can be incorporated in the polymerization system before the catalyst is added, or the scavenger and catalyst can be combined and the combination added to the polymerization system. If the scavenger and catalyst are added together, it is essential that the components of the catalyst be allowed to react with each other before the scavenger is combined with the catalyst. The scavenger itself has little if any catalytic activity. Preferably the scavenger is brought into contact with the monomer or monomers and any added solvent before the catalyst is added. The organo(transition metal) compound should not be allowed to come in contact with the 1-olefin or 1-olefins to be polymerized before it has come in contact with and reacted with the alumina.

Care was taken in each example to exclude oxygen and water during the polymerization reaction and during all steps carried out prior to the polymerization reaction. All materials used were of high purity. Catalyst slurries and scavenger slurries were made up under nitrogen, and all transfers were carried out under nitrogen.

Except as noted, the alumina used was Degussa ® fumed alumina that was equilibrated with atmospheric moisture, heated in a stream of nitrogen to at least 400° C. for 4 hours, and then cooled under nitrogen.

Tetraneophylzirconium was used as an 0.1 M solution in toluene.

EXAMPLE 1

A mixture of 60 mL of cyclohexane, 0.2 mmol of tetraneophylzirconium, and 1 g of alumina was stirred for 30 minutes at room temperature, after which a suspension of 0.1 g of calcium oxide in 4 ml of cyclohexane was added. The calcium oxide had been dried for 4 hours at 500° C. in a stream of nitrogen. The slurry was transferred to a 1-L stainless-steel autoclave equipped with a stirrer and thermocouple. The autoclave was closed, cooled in dry ice/acetone, and charged with 168 g of propylene. The mixture was heated with stirring to 50° C., at about which temperature an exothermic polymerization took place, and the temperature rose rapidly to 65° C. and then gradually fell to 49° C. The reactor was vented and cooled 1 hour after the temperature first reached 50° C. The solid product was separated and dried under reduced pressure, to give 160 g of elastomeric polypropylene. This amount corresponds to a yield of 800 g of polypropylene per mg-atom of zirconium in the tetraneophylzirconium. This is a high yield compared with what is usually realized in runs not involving a Group IIa metal compound as scavenger. For example, the corresponding yields in Examples 1, 3, 4 and 6 of the aforesaid British Specification No. 2,001,080A are 283, 273, 406, and 177 g of polypropylene per mg-atom of zirconium, respectively.

EXAMPLE 2

A catalyst/scavenger mixture was made up as in Example 1 from 100 mL of cyclohexane, 0.15 mmol of tetraneophylzirconium, 1 g of alumina, and 0.3 g of magnesium oxide (Merck Maglite ®-D) that had been dried at 500° C. in a stream of nitrogen.

An autoclave like that of Example 1 was charged with 168 g of propylene and heated with stirring to about 100° C., at which point the catalyst/scavenger mixture was injected. The mixture was heated at 89°-112° C. with stirring for 1 hour, after which the autoclave was vented and cooled. After drying there was obtained 86 g of elastomeric polypropylene, or 573 g per mg-atom of zirconium. The product was molded to a very uniform sheet by heating under pressure. Two determinations of permanent set on this sheet gave values of 63% and 71%.

Permanent set was determined substantially according to the method described in ASTM D 412. "Dumbbell" samples were elongated on an Instron Model TM tester at 20 inches (51 cm) per minute to break. After break the two parts of the sample were allowed to retract for about 5 minutes at about zero stress, and the total percent elongation of the two parts was measured; this value is the permanent set (PS).

In a comparative experiment without the magnesium oxide scavenger, a mixture of 35 mL of cyclohexane, 1 g of alumina, and 168 g of propylene was heated with stirring to 90° C., at which point 0.2 mmol of tetraneophylzirconium was injected. The polymerization was run at 90°-95° C. for 1 hour and gave 42 g of elastomeric polypropylene or 210 g per mg-atom of zirconium. The permanent set of a hot-pressed sheet was 197%, 144%.

This example shows that the scavenging system of the invention reduces the permanent set of elastomeric polypropylene made at about 90°-100° C. (such reduction being a desirable effect to be achieved in an elastomer) and increases the yield per mg-atom of transition metal.

EXAMPLE 3

Magnesium oxide (25 g) that had been dried at 400° C. in a stream of nitrogen was slurried with 400 mL of cyclohexane, and 20 mmol of triisobutylaluminum as a 1 M solution in heptane was added. The solution was stirred intermittently over a period of 1 hour.

An autoclave like that of Example 1 was charged with 16 mL of a suspension prepared as described above, and containing 1 g of triisobutylaluminum/magnesium oxide, and with 100 mL of cyclohexane and 168 g of propylene. The mixture was heated to 50° C. with stirring, and a suspension of 1 g of alumina, 0.15 mmol of tetraneophylzirconium, and 100 mL of cyclohexane was injected. An exothermic polymerization took place, and the temperature rose rapidly to 96° C. The polymerization was conducted at 50°-96° C. for 1 hour, after which the autoclave was vented and cooled. After drying the elastomeric polypropylene thus produced weighed 74 g, corresponding to a yield of 493 g per mg-atom of zirconium.

A hot-pressed sheet of the product had a permanent set of 5%, 17%.

EXAMPLE 4

An autoclave like that of Example 1 was charged with 0.5 mmol of triisobutylaluminum and 168 g of propylene, and the mixture was heated to 50° C. and stirred at this temperature for 30 minutes. A suspension of 2 g of calcium oxide and 50 mL of cyclohexane was pressured in, and the mixture was stirred for 30 minutes more at 50° C. A catalyst suspension comprising 1 g of alumina, 0.10 mmol of tetraneophylzirconium, and 50 mL of cyclohexane was pressured in. An exothermic polymerization took place, and the temperature rose rapidly to 68° C. and then gradually fell to 50° C. over 25 minutes. The polymerization was continued for 1 hour after the injection of the catalyst system, and the autoclave was vented and cooled. There was isolated 33 g of elastomeric polypropylene, in addition to a single mass of product that adhered to the thermocouple well. The permanent set of a hot-pressed sheet of the product was 20%, 22%.

Trialkylaluminums themselves have been used as scavengers in olefin-polymerization systems involving conventional organometallic/transition metal catalysts. They cannot normally be used with catalyst systems of the type used herein and/or disclosed in the aforesaid British Specification No. 2,001,080A, since they alter the course of polymerization and the nature of the resultant polymer. This example shows that they can be used in such systems provided the requisite Group IIa metal compound of this invention is added before the start of the polymerization.

EXAMPLE 5

An initiator/scavenger system was made by adding 1 g of alumina to a solution of 0.5 mmol of tetraneophylzirconium in 100 mL of cyclohexane, allowing the suspension to age for 30 minutes with occasional stirring, and adding 1.6 g of magnesium oxide. The resulting suspension was injected into a stirred solution of 100 mL of cyclohexane and 168 g of propylene at 50° C. in an autoclave like that of Example 1. An exothermic polymerization caused the temperature to rise briefly to 82° C. The polymerization was conducted for 1 hour, mainly at 50°-60° C., after which the autoclave was vented and cooled. There was obtained 80 g of elastomeric polypropylene, corresponding to a yield of 160 g per mg-atom of zirconium.

The permanent set of a hot-pressed sheet of the product was 30%; a film of the product had a crystallinity number of 28. "Crystallinity number" is defined as the ratio of the intensity of the infrared absorption at 10.02$\mu$ to the intensity of the infrared absorption at 10.28$\mu$. Infrared absorption spectra were measured on films 1–3 mils (0.025–0.076 mm) thick. The higher the crystallinity number, the higher the crystallinity of the polypropylene.

The permanent set and the crystallinity number of the product of this example were unexpectedly and desirably low. For example, in an experiment not reported herein, a polypropylene prepared with a catalyst comprising 0.4 mmol of tetraneophylzirconium per gram of alumina in the absence of a magnesium oxide exhibited, in sheet form, a permanent set of 66% and, in film form, a crystallinity number of 43. Only at relatively low tetraneophylzirconium/alumina ratios, e.g., 0.15 mmol per gram, are such low values of permanent set and crystallinity number generally realized in the absence of magnesium oxide.

EXAMPLES 6–12

Using substantially the methods disclosed in Examples 1–5, with variations as noted below, additional polymerizations of 1-olefins were carried out. Details are summarized in Table I. In the table the following symbols are used:

P = propylene
B = 1-butene
E = ethylene
TNZ = tetraneophylzirconium
PS = permanent set (average of 2 determinations).

In Example 7 Alcoa® XF-100 large pore alumina was used. The "mixing order" column in the table shows the mixing order of the various materials; the numbers correspond to the numbers at the heads of the columns. In Example 6 an additional 1 g of MgO was added with (2).

TABLE I

| Ex. | (4) g Olefin | (2) mmol TNZ | g Al$_2$O$_3$ | (3) mmol | (3) R$_3$Al | (1) g Gp. IIa metal cpd | Mixing Order |
|---|---|---|---|---|---|---|---|
| 6 | 168 P | 0.15 | 1 | 0.5 | Me$_3$Al | 1 MgO | 342 |
| 7 | 224 B | 0.4 | 2 | 0.5 | Me$_3$Al | 3 MgO | 342 |
| 8 | 168 P | 0.15 | 1 | 0.5 | Me$_3$Al | 1 MgO | 342 |
| 9 | 168 P | 0.15 | 1 | 0.8 | iBu$_3$Al | 1 MgO | 342 |

TABLE I-continued

| Ex. | Polymn Temp. °C. | hr:min | g | Polymer g/mg-atom Zr | PS | Cryst. No. |
|---|---|---|---|---|---|---|
| 10 | ca. 25 E | 0.12 | 1 | — | — | 1 MgO | 214 |
| 11 | ca. 25 E | 0.12 | 1 | 0.5 | Oct₃Al | 1 MgO | 342 |
| 12 | 168 P | 0.1 | 1 | — | — | 0.2 Ca(OH)₂ | 214 |

| Ex. | Polymn Temp. °C. | hr:min | g | g/mg-atom Zr | PS | Cryst. No. |
|---|---|---|---|---|---|---|
| 6 | 40–60 | 1:00 | 88 | 587 | 42 | 30 |
| 7 | 50 | 2:00 | 37 | — | — | — |
| 8 | 50–68 | 1:00 | 55 | 367 | 10 | 36 |
| 9 | 50–75 | 1:00 | 78 | 520 | 30 | 27 |
| 10 | 200–210 | 0:05 | 30 | — | — | — |
| 11 | 200–212 | 0:05 | 20 | — | — | — |
| 12 | 50 | 1:00 | 66 | 660 | 55 | — |

EXAMPLES 13–16

These examples show the effect of using the scavenger-containing catalyst system of the invention in the terpolymerization of ethylene, propylene, and 1,4-hexadiene. Details are summarized in Table II.

In these examples, a 1-gal (3.8-L) stainless-steel autoclave equipped with a stirrer and a thermocouple was charged with 2 L of cyclohexane, 50 mL of 1,4-hexadiene, 336 g of propylene, and 60 g of ethylene. In Examples 14 and 15, following the charging of cyclohexane, the autoclave was additionally charged with a suspension in cyclohexane of 2 g of magnesium oxide that had been treated with 0.5 mmol of trimethylaluminum. The trimethylaluminum/magnesium oxide system was made up by substantially the method of Example 3, a 1.5 M solution of trimethylaluminum in cyclohexane being used in place of triisobutylaluminum in heptane. The system was heated to the desired polymerization temperature with stirring, and a suspension of 4 g of alumina, 0.6 mmol of tetraneophylzirconium, and 150 mL of cyclohexane was injected. A pressure of about 400 psi (2760 kPa) was maintained as necessary by periodic injection of ethylene. The amount of ethylene absorbed was determined from the weight loss in the supply cylinder. Examples 13, 14 and 15 were run sequentially in the same autoclave.

TABLE II

| Ex. | Temp. (°C.) | hr:min | Grams ethylene absorbed | Grams terpolymer produced |
|---|---|---|---|---|
| 13 | 100 | 1:55 | 0 | 0 |
| 14 | 100–124 | 1:00 | 40 | 118 |
| 15 | 120–125 | 0:44 | 40 | 94 |
| 16 | 125 | 0:55 | 0 | 0 |

A hot pressed film of the ethylene/propylene/1,4-hexadiene terpolymer produced in Example 14 was crosslinked with $S_2Cl_2$.

BEST MODE FOR CARRYING OUT THE INVENTION

Among the examples, the best mode is illustrated by Example 3. Ethylene is equally preferred along with propylene as the olefin to be polymerized. Triisobutylaluminum and triethylaluminum are believed to be the most-preferred alkylaluminums; the triethyl- may be slightly more preferred because of lower cost.

INDUSTRIAL APPLICABILITY

The industrial applicability of 1-olefin polymers, as well as catalysts and processes for preparing such polymers, is well known to one skilled in this art. The present invention provides an improved catalyst system for producing such polymers.

Although preferred embodiments of the invention have been illustrated and described in the above disclosure, it is to be understood that there is no intent to limit the invention to the precise constructions herein disclosed, and it is to be further understood that the right is reserved to all changes and modifications coming within the scope of the invention as defined in the appended claims.

I claim:

1. Improved 1-olefin polymerization catalyst system comprising a reaction product of alumina and an organometallic compound of the formula $(RCH_2)_4M$ wherein M is Ti, Zr or Hf and R is a group which is such that there is no hydrogen atom attached to an atom which is in the β-position to M, the improvement characterized in that the preformed catalyst system is combined with an oxide, hydroxide, or carbonate of magnesium, calcium, strontium, or barium.

2. Catalyst system of claim 1 wherein the oxide, hydroxide, or carbonate is of magnesium.

3. Catalyst system of claim 2 wherein the oxide, hydroxide, or carbonate of magnesium is MgO.

4. Catalyst system of claim 1 wherein the oxide, hydroxide, or carbonate is of calcium.

5. Catalyst system of claim 4 wherein the oxide, hydroxide, or carbonate of calcium is CaO.

6. Catalyst system of claim 1 wherein R is aryl, aralkyl, tertiary alkyl or trialkylsilyl.

7. Catalyst system of claim 1 wherein the atom which is in the β-position to M is carbon.

8. Catalyst system of claim 1 wherein the organometallic compound is tetraneophylzirconium.

9. Catalyst system of claim 1 wherein the oxide, hydroxide, or carbonate of magnesium, calcium, strontium, or barium is used in combination with an alkylaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to about 10 carbon atoms each.

10. Catalyst system of claim 9 wherein the alkylaluminum compound is a trialkylaluminum.

* * * * *